United States Patent
Safwat et al.

(10) Patent No.: US 7,316,175 B2
(45) Date of Patent: Jan. 8, 2008

(54) REDUCED-BULK, ENHANCED-RESILIENCE, LOWER-DRAG NETTING

(75) Inventors: Sherif Adham Safwat, Davis, CA (US); Valentin Gavrilovich Perevoshchikov, Kaliningrad (RU)

(73) Assignee: Hampidjan, HF, Hafnarfjörður (IS)

( * ) Notice: Subject to any disclaimer, the term of this patent is extended or adjusted under 35 U.S.C. 154(b) by 15 days.

(21) Appl. No.: 10/312,464

(22) PCT Filed: May 7, 2002

(86) PCT No.: PCT/US02/15787

§ 371 (c)(1),
(2), (4) Date: Dec. 24, 2002

(87) PCT Pub. No.: WO02/095107

PCT Pub. Date: Nov. 28, 2002

(65) Prior Publication Data

US 2004/0038604 A1  Feb. 26, 2004

(51) Int. Cl.
*D04G 1/08* (2006.01)
(52) U.S. Cl. ........................................................ 87/53
(58) Field of Classification Search .................. 87/12, 87/13, 53, 62; 43/7, 9.1, 9.8, 9.95
See application file for complete search history.

(56) References Cited

U.S. PATENT DOCUMENTS

| | | | | |
|---|---|---|---|---|
| 2,162,115 A | * | 6/1939 | Pauls | 87/12 |
| 3,686,381 A | * | 8/1972 | Fairbanks | 264/103 |
| 4,155,394 A | * | 5/1979 | Shepherd et al. | 152/527 |
| 4,619,108 A | * | 10/1986 | Hotta | 57/236 |
| 5,179,827 A | * | 1/1993 | Tinsley et al. | 57/204 |
| 5,321,960 A | * | 6/1994 | Whitt et al. | 66/182 |
| 5,899,134 A | * | 5/1999 | Klein et al. | 87/9 |

* cited by examiner

Primary Examiner—Shaun R. Hurley
(74) Attorney, Agent, or Firm—Donald E. Schreiber

(57) ABSTRACT

Netting (15) includes mesh bars (26) made from twines (11, 13) which possess physical properties that vary, change or alternate along a series of collinear mesh bars (26). The non-homogeneous media obtained by arranging in this way mesh bars (26) having varying physical properties may be configured to dampen or attenuate vibrations in the netting (15) such as harmonic oscillations (resonance). Furthermore, twines (11, 13) that attenuate vibrations may be chosen that also reduce the amount of material required to make netting (15) which has strength similar to or greater than conventional machine-made netting (15). Due to reduced vibration, the improved netting (15) lasts longer than conventional machine-made netting (15), and reduces the possibility of injury to fish which escape through a trawl's mesh cell openings.

14 Claims, 6 Drawing Sheets

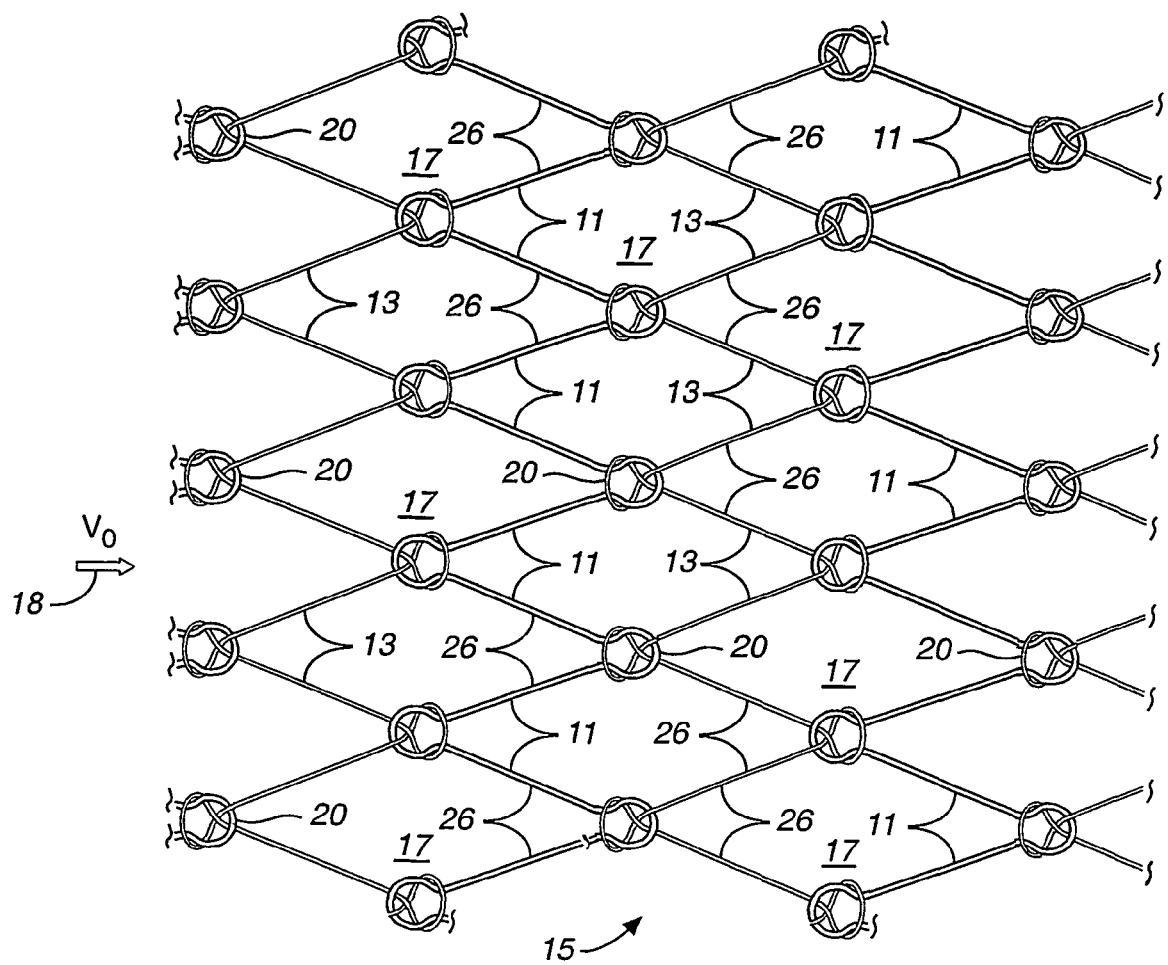
FIG._1A

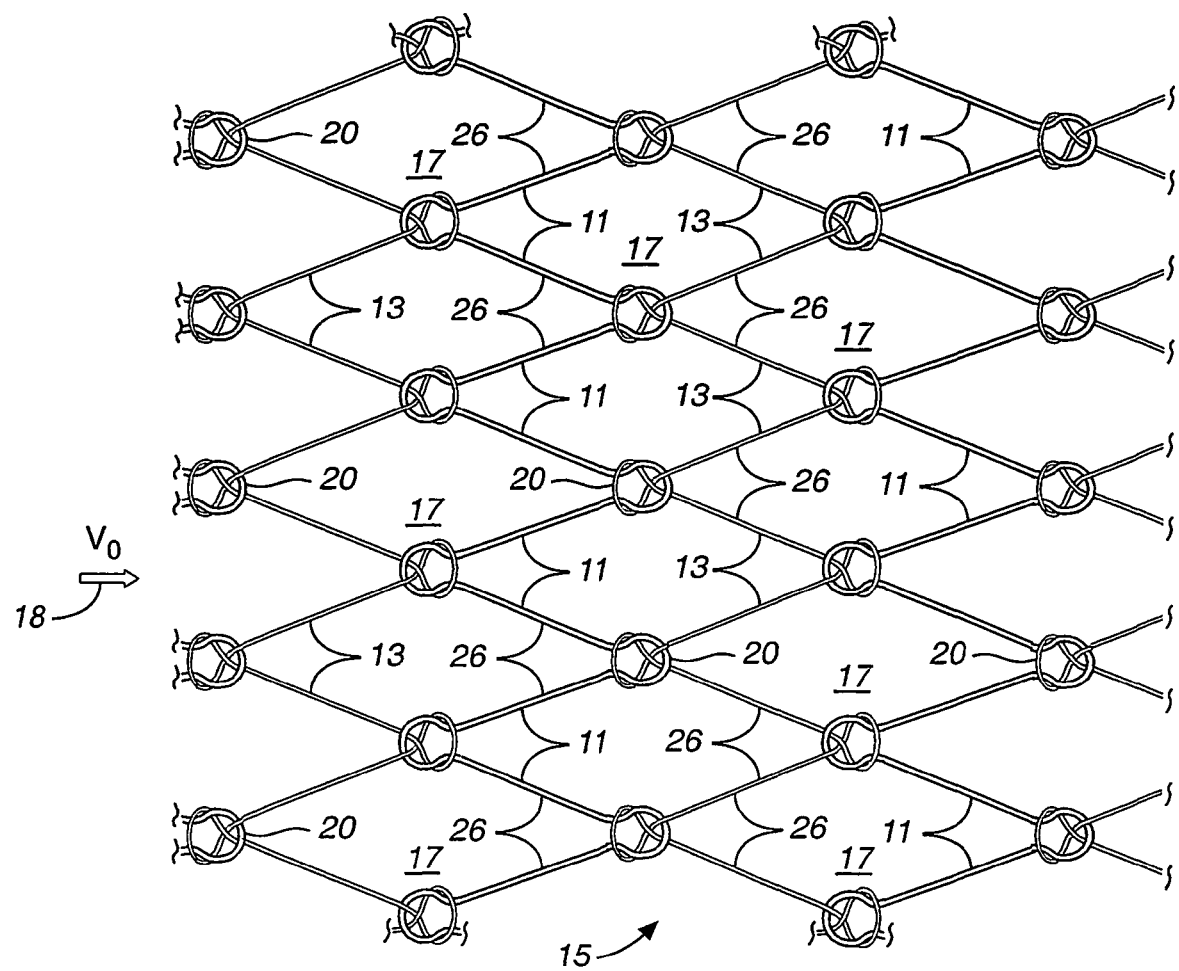
FIG._1B

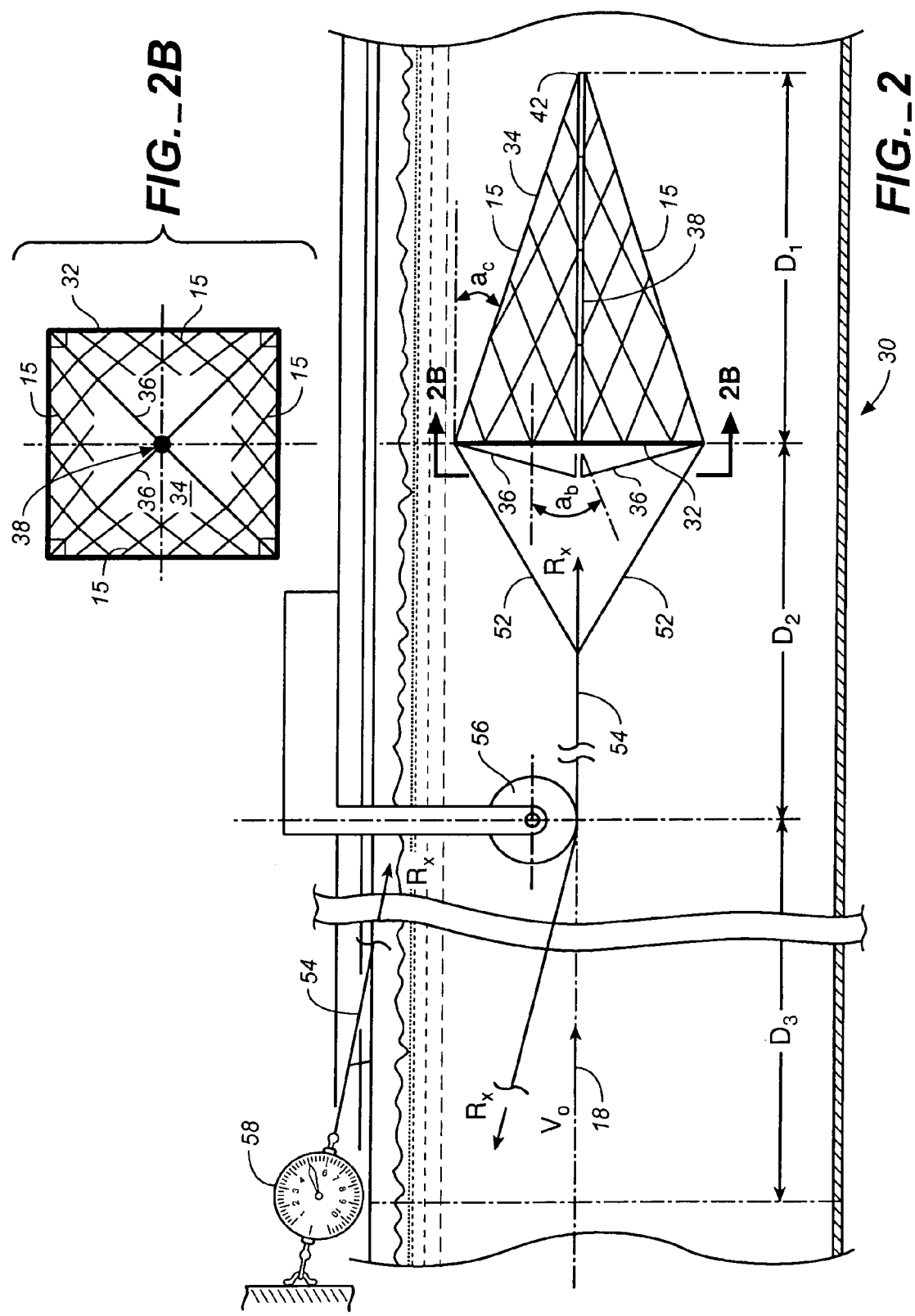

Comparison of Drag and Breaking Strength
100 mm Netting
Conventional Netting - Euroline Premium 3.5 mm Diameter Twine
Improved Netting - Euroline 3.5 mm and 2.5 mm Diameter Twines

| Velocity / Material | 1.50 m/s | 1.75 m/s | 2.00 m/s | Mesh knot break value 4 leg 1 knot Before | Mts./kg |
|---|---|---|---|---|---|
| Conventional Netting Euroline Premium 3.5mm 100 mm mesh | $R_X$=15 kg (at 15.5% higher drag) | $R_X$=21 kg (at 17.0% higher drag) | $R_X$=25 kg (at 14.0% higher drag) | 190 kg ARID | 200 |
| Improved Netting Eur.Prem.3.5 Eur.Prem.2.5 100 mm mesh | $R_X$=13 kg | $R_X$=18 kg | $R_X$=22 kg | 190 kg ARID | 231 46% Eur.Prem.3.5 54% Eur.Prem.2.5 |

Angle of attack — $a_{at}$ = 33° ± 1°; Angle of mesh opening — $a_\beta$ = 30° ± 1°; Angle of cone — $a_c$ = 13.5° ± 1°;

*FIG._3*

Comparison of Drag and Breaking Strengths
200 mm Netting
Conventional Netting - Euroline Premium 3.5 mm Diameter Twine
Improved Netting - Euroline 3.5 mm and 2.5 mm Diameter Twines

| Material \ Velocity | 1.50 m/s | 1.75 m/s | 2.00 m/s | Mesh knot break value 4 leg 1 knot Before | Mts./kg |
|---|---|---|---|---|---|
| Conventional Netting Premium 3.5mm 200 mm mesh | $R_X$=7.0 kg (at 20% higher drag) | $R_X$=8.8 kg (at 20% higher drag) | $R_X$=10.1 kg (at 31% higher drag) | 190 kg DRY | 200 |
| Improved Netting Eur.Prem.3.5 Eur.Prem.2.5 200 mm mesh | $R_X$=5.8 kg | $R_X$=7.3 kg | $R_X$=7.7 kg | 190 kg DRY | 231 46% Eur.Prem.3.5 54% Eur.Prem.2.5 |

Angle of attack —$a_{at}$ = 30° ± 1°; Angle of mesh opening —$a_\beta$ = 27° ± 1°; Angle of cone —$a_c$ = 14° ± 1°;

*FIG._4*

Comparison of Drag and Breaking Strengths
400 mm Netting
Conventional Netting - Euroline 4.0 mm Diammeter Twine
Improved Netting - Euroline 4 mm and 2.8 mm Nylon Twines

| Velocity / Material | 1.50 m/s | 1.75 m/s | 2.00 m/s | Mesh knot break value 4 leg 1 knot Before | Mts./kg |
|---|---|---|---|---|---|
| Conventional Netting 4mm 400 mm mesh | $R_X$=5.0 kg (at 61% higher drag) | $R_X$=6.3 kg (at 66% higher drag) case A | $R_X$=6.3 kg (at 50% higher drag) | 236 kg DRY | 150 |
| Improved Netting Euroline 4 mm Nylon dern.40 400 mm mesh | $R_X$=3.1 kg case A | $R_X$=3.8 kg | $R_X$=4.2 kg | 238 kg DRY | 184 53% polyeth 47% nylon |

| Material | Angle of attack —$a_{at}$ case A | Angle of mesh opening —$a_\beta$ case A | Angle of cone —$a_c$ case A | Square area of panel |
|---|---|---|---|---|
| EUROLINE | 36° ± 1° | 27° ± 2° | 23° ± 1° | 0.128 m² |
| OTTER Ultra-Low-Drag CP | 36° ± 1° | 27° ± 2° | 24.5° ± 1° | 0.107 m² |

FIG._5

REDUCED-BULK, ENHANCED-RESILIENCE, LOWER-DRAG NETTING

TECHNICAL FIELD

The present invention relates generally to the technical field of netting and, more particularly, to netting useful for fishing.

BACKGROUND ART

Currently available fish netting exhibits ascertainable properties for material cost, durability, and hydrodynamic drag, i.e. the netting's resistance to movement through water. For fishing trawlers, higher netting drag increases fuel consumption, and requires operating engines at higher speed which reduces engine life.

Manufacturers of conventional knotted netting try to achieve a uniform mesh throughout sheets of netting that are frequently referred to as netting panels. This uniformity includes uniformity of twines (i.e. all twines having identical physical characteristics), uniformity of mesh size, and uniformity of mesh bar length. Manufacturers frequently advertise uniformity throughout a netting panel's twines and mesh sizes as a favorable netting characteristic.

Since conventional knotted netting is a commodity product with numerous manufacturers competing in offering their products to the same group of potential purchasers, another desirable netting characteristic is that it have low manufacturing cost.

A significant operational characteristic of conventional knotted fish netting is that it fatigues during use. That is, new conventional netting loses strength after being placed in service. It has also been observed that conventional knotted fish netting almost always fails in the same way. The first observation is that conventional knotted fish netting almost always breaks at the knot which couples together two intersecting twines, a basic twine and a shuttle twine. Furthermore, it has also been observed that, depending upon the specific types of twine used in making the conventional knotted fish netting, almost always the same twine, i.e. the basic twine or the shuttle twine, breaks.

In an attempt to ensure a minimum netting strength after a specified interval of use and to thereby avoid fatigue failure, newly manufactured conventional knotted netting must be much stronger initially than the minimum strength required at the end of the netting's service life. The additional material required so conventional netting avoids fatigue failure and thus guarantees a minimum strength after a specified interval of use increases the netting's bulk which correspondingly increases the netting's drag and the cost of manufacture.

The bulk of conventional long lived knotted netting adversely affects midwater trawls and other fishing gear. A conventional midwater trawl includes a front-end and mouth which includes wings that tend to herd fish toward the center of the trawl. The aft end of the trawl's front-end connects to a back end or mid-portion jacket of the trawl. A codend or brailer bag connects to the aft end of the back end and closes the end of the trawl furthest from the front-end.

It is highly desirable to have as much volume as possible in the back end of midwater trawls to increase fish flow and water velocity flow into the brailer bag or codend, while keeping open the mesh in the netting that forms the back end of the trawl. Keeping open the mesh in netting forming the back end of the trawl also reduces bycatch, unintended catching of marine organisms. Bycatch increases if the drag of conventional netting collapses the back end of the trawl thereby preventing smaller marine organisms from passing through the netting.

A midwater trawl's back end is usually assembled from conventional machine-made knotted netting. When being towed through the water, conventional netting entrains a pressure wave in the water. The pressure wave created by the bulk of back end's netting produces what is known colloquially as a bucket effect. This pressure wave produces competing forces which act on the netting both:

1. to keep the back end of midwater trawls open thereby effectively operating analogously to a conventional sea anchor; and
2. to significantly reduce the trawl's volume due to tension in the trawl caused by the netting's drag.

Another characteristic exhibited by currently available machine-made knotted netting is that it usually vibrates when towed through a water entrained environment similar to the flapping of a flag in the wind. The vibration experienced with conventional machine-made knotted netting can descale fish if they pass through netting rather than being caught therein, particularly if the netting is vibrating. The problem of descaling is of particular concern for pelagic and semi-pelagic species of fish.

In view of the considerations set forth above, it is clearly advantageous if netting exhibits the lowest possible drag for specified strength. Furthermore, it is highly desirable if netting, in addition to the preceding characteristics, also exhibits good:

1. elongation thereby providing the netting with load sharing across a netting panel and shock absorbing properties; and
2. resistance to fatigue failure, i.e. netting which exhibits resilience and retains its strength better throughout the netting's service life.

Presently there exist three (3) subtly different types of conventional machine-made knotted netting. The subtle differences that occur among different machine-made knotted netting arise from the way in which netting machines knit the knots that couple immediately adjacent pairs of twines to each other. A first difference is that:

1. for two (2) types of machine-made knotted netting the same twine of a pair of immediately adjacent twines is always use for forming the same part of the weavers knot, e.g. one twine of an immediately adjacent pair of twines always forms the bight while the other twine always forms the loop; and
2. for a third type of machine-made knotted netting both twines are used alternatively, back and forth for forming respectively the bight and the loop.

Within the first type of machine-made knotted netting described above:

1. in one (1) type of machine-made knotted netting the loop of the knot being always formed with the same twine also always turns in the same direction, i.e. always has clockwise or counter-clockwise; and
2. in a second type of this machine-made netting the knot's loop alternates direction between immediately adjacent pairs of knots, i.e. the direction clockwise or counter-clockwise for the loop alternates back and forth between immediately adjacent knots.

Those skilled in the art frequently refer to the two different rotations for the loop, i.e. clockwise or counter-clockwise, as being either a Z-type or an S-type weavers knot. The second type of machine-made netting identified above in which the loop alternates direction tends to counterbalance twist in the twines and the finished netting, and also reduces weakening of the twines at knots.

In addition to attempting to produce machine-made netting which doesn't twist-up, netting manufacturers also employ various techniques in attempting to improve fatigue resistance, i.e. improve the resilience, of machine-made netting. One technique used to improve fatigue resistance is incorporating a larger sized knot, e.g. double knotting, at junctures between individual twines that form the cell bars of conventional knotted netting. The principle underlying the use of larger sized knots is that intersecting twines forming larger knots have a larger bend radius which distributes load on the twines more uniformly across the twines entire cross-section. Thus, it is widely believed in the netting industry that one way to obtain a greater strength retention from a given twine used in machine-knotted netting is to increase knot size, either by doubling the twines (i.e. two parallel twines in place of one), or by making a double knot. However, while it is widely believed that the larger the knot the stronger the netting, it is also widely believed that the larger the knot, the greater the netting's drag. Consequently, this particular solution for improving fatigue failure increases netting drag in order to provide netting that is stronger and exhibits resilience.

Since fishing gear drag reduction is a significant factor in overall efficacy of a fishing operation, a decision to accept greater drag in portions of fishing gear in order to obtain greater resilience tend to be carefully balanced. Thus, the use of netting having larger sized knots is generally disfavored throughout most of a trawl net. The use of enlarged knot netting tends to be confined to limited regions of trawl nets, particularly regions that regularly incur higher loads and abrasion.

It is also a widely held belief among netting manufacturers that the greater the amount of material in the netting, for example the larger the twine diameter for a given twine density and material, that the netting must inevitably be stronger and more resilient to fatigue failure. Thus, a widely held belief is that, while smaller size twines and smaller knot sizes produce lower drag netting, they also reduce the netting's strength and resilience.

In view of the preceding considerations, due to an increasing demand for lower drag netting in the fishing industry, there presently exists a desire for knotted netting that employs a reduced knot size and reduced amount of material while remaining just as strong or even stronger than a netting which employs a larger size knot and more material.

The most widely adopted and generally viewed as most successful solutions to the preceding problems include the use of expensive superfiber materials such as ultra high molecular weight polyethylene, identified by the trademarks Dyneema® and Spectra®. Spectra is a highly modified polyethylene fiber material developed by Honeywell, Inc. that is manufactured by Allied-Signal Inc. of Morristown, N.J. Dyneema, which is similar to the Spectra fiber, is a high modulus polyethylene fiber made by DSM High Performance Fibers B.V. of Heerlen, Kingdom of Netherlands. An alternative solution to the use of superfiber materials is the use of high tenacity materials, specifically more concentrated, i.e. more drawn and thus higher tenacity, polyethylene materials.

The Dyneema and Spectra materials, rather than providing comprehensive solutions to the preceding problems, have only experienced limited use because they are substantially inelastic, and are significantly more expensive than other competing materials. Consequently, in many instances knotted netting made from Dyneema or Spectra material provide some but not all of the desirable netting characteristics summarized above. Specifically, use of knotted netting made from Dyneema or Spectra material is usually limited to applications which require high strength and, in many cases, very low drag and fatigue resistance. However, due to the poor elongation characteristics of Dyneema or Spectra materials, and the concurrent inability to distribute unbalanced loads across a netting panel, trawl nets which incorporate sheets of machine-made knotted netting made from superfibers sometimes experience fish net collapse as well as loads being borne by isolated sections of the panel which may break mesh cell bars. Dyneema, Spectra and other superfiber materials are also not widely used in larger mesh sizes in, for example, the front-end of midwater trawls. One reason that superfiber materials are not used in larger mesh sizes is that they exhibit comparatively high drag when used for forming larger size mesh.

Lastly, and significantly, netting made from superfiber materials are several times more expensive than comparable nettings made using other materials such as conventional polyethylene, nylon, polyester and so forth, and the high tenacity versions of such materials. The expense of netting made from Dyneema, Spectra and other superfiber materials limits their accessibility even to fishermen in developed nations. Consequently, nettings made from such materials are all but economically inaccessible to fishermen in underdeveloped nations, which nations account for a large portion of overall worldwide fish netting sales.

Netting made from high tenacity materials, such as more concentrated polyethylene filaments, known as high tenacity polyethylene ("HTPE"), have been successful because they exhibit higher strength than netting made with conventional materials while also providing some elongation to thereby distribute load throughout a netting panel. However, the use of modern HTPE material either already is or appears soon to be counter balanced by the fact that the relative strength of netting made from HTPE deteriorates relatively rapidly during the first twenty-four (24) hours of use. For example, commercial netting made from HTPE material available in 2001 looses sixteen percent (16%) of its initial strength during the first 24 hours of use. Conversely, a comparable netting made using HTPE material available in 1999 looses only four percent (4%) of its initial strength during the same time interval. The rate at which netting made from the two materials loose strength continues to differ throughout the remainder of netting's service life.

HTPE material's lack of resilience severely compromises its use in standard netting. One example of this limitation is that HTPE material has not been widely favored in high wear applications, such as on bottom panels of trawls. The general perception is that netting made from HTPE wears poorly. However, it appears that the rapid deterioration over time experienced with netting made from the more concentrated and thus more brittle HTPE materials is the primary reason that such netting exhibits poorer wear characteristics than those of netting made from standard polyethylene material.

In view of the preceding considerations, there exists a need for netting that exhibits low hydrodynamic drag, e.g. drag comparable to the drag of netting made from Dyneema or Spectra material, while also exhibiting the substantial elongation and lower cost of netting made from conventional nylon or polyethylene materials. Further, due to the dramatically high costs of Dyneema netting, there remains a need for a netting construction which provides strength similar to or better than that of Dyneema or Spectra netting, particularly if it provides significantly reduced material usage and cost. There also exists a need for a construction which permits netting made from HTPE materials to exhibit better resilience in comparison with netting made from HTPE materials using a conventional netting construction.

DISCLOSURE OF INVENTION

Definitions

COMPACT TWINE as used herein means a twine including:
1. a core such as of:
   a. twisted, including loosely twisted filaments;
   b. parallel filaments; or
   c. braided core; and
2. a sheath especially a braided sheath which surrounds the core.

DIAMETER as used herein for a characteristic of twines means a twine having any cross-sectional shape that has a cross-sectional area which equals the cross-sectional area of a twine having a circular cross-sectional shape with the stated diameter.

MESH BAR as used herein means the sides of a mesh cell excluding knots or other types of couplers used instead of knots.

MESH CELL as used herein means the sides of a mesh and includes at least three sides and associated knots or equivalent couplers oriented in space. A quadratic mesh cell has four sides with four knots or couplers, and is usually arranged to form a parallelogram (including rectangular and square), with diamond-shaped mesh (trawl mesh) being preferred. A triangular mesh cell has three sides and three knots or couplers. A hexagonal mesh cell has six sides and six knots or couplers.

MESH SIZE as used herein means the distance between knots or couplers that are located on opposite sides of a square mesh cell when the mesh cell is completely closed. Thus a measurement of mesh size as used herein is approximately equal to the length of two mesh bars arranged end-to-end.

TWINE as used herein means a strong string or cord that is woven or braided from materials such as synthetic or natural fibers, or any combination thereof.

The present invention provides an improved netting construction.

An object of the present invention is to provide a netting construction using conventional or high tenacity materials which exhibits strength and drag characteristics that are comparable to or better than netting made from superfibers such as Dyneema or Spectra material.

Another object of the present invention is to provide a netting construction using conventional or high tenacity materials which exhibits strength that is comparable to or better than netting made from superfibers such as Dyneema or Spectra material, and which also exhibits substantial elongation.

Another object of the present invention is to provide a netting construction using conventional or high tenacity materials which exhibits strength that is comparable to or better than netting made from superfibers such as Dyneema or Spectra material, which reduces material cost, and is less expensive to manufacture.

Another object of the present invention is to provide a lighter netting construction having a strength which equals that of a heavier conventional netting construction and also having a smaller knot size.

Another object of the present invention is to provide a netting construction having a strength which exceeds that of a conventional netting construction but which exhibits an equal or lesser drag.

Another object of the present invention is to provide a netting construction which, when made from modern HTPE materials, exhibit improved resilience.

A further object of the present invention to provide a netting construction which exhibits reduced drag.

A further object of the present invention to provide a netting construction which uses a smaller knot and less material amount that is just as strong or even stronger compared to a netting employing a larger size knot and higher material weight.

A further object of the present invention to provide netting which facilitates substantial increase in the volume of the back ends of midwater trawls.

Briefly, netting in accordance with the present invention includes mesh bars which possess physical properties that vary, change or alternate along a series of collinear mesh bars. The non-homogeneous media obtained by arranging in this way mesh bars having varying physical properties may be configured to dampen or attenuate vibrations in the netting such as harmonic oscillations (resonance). Furthermore, twines may be chosen which, in addition to dampening or attenuating vibrations and/or harmonic oscillations, advantageously reduce the amount of material required to make netting which is similar in strength to or stronger than conventional machine-made netting.

In one aspect, the present invention is an improved method of making netting that includes mesh cells having pairs of mesh bars that are fabricated from continuous lengths of material respectively of a basic twine and of a shuttle twine. Pairs of the mesh bars of each mesh cell are connected at intersections between the basic twine and shuttle twine. The improved method includes the step of selecting materials for at least one of the twines which have varying physical properties that serve to attenuate vibration of the netting during field operations in which the netting moves relative to a water entrained environment.

In another aspect, the present invention is an improved netting that includes mesh cells having pairs of mesh bars fabricated from continuous lengths of material respectively of a basic twine and of a shuttle twine. Pairs of mesh bars included in the mesh cell are connected at intersections between the basic twine and shuttle twine. The improved netting includes materials for at least one of the twines which have varying physical properties that are selected to attenuate vibration of the netting during field operations in which the netting moves relative to a water entrained environment.

An advantage of the present invention is that it permits constructing improved netting which has the same strength as conventional netting but uses less material.

Another advantage of the present invention is that it permits constructing improved netting which has the same strength as conventional netting but which exhibits lower hydrodynamic drag.

Another advantage of the present invention is that for the same initial strength, the improved netting looses less strength than conventional netting after equivalent intervals of use.

Another advantage of the present invention is that it permits building midwater trawls having a much larger volume back end.

Another advantage of the present invention is that it reduces the possibility of injury to fish which escape from a trawl through mesh cell openings.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 1a is a plan view illustrating part of a netting panel in accordance with the present invention in which the loops of weavers knots all turn in the same direction;

FIG. 1b is a plan view illustrating part of a netting panel in accordance with the preferred embodiment of the present invention in which the loops of weavers knots alternate turning direction between immediately adjacent knots;

FIG. 2 is a cross-sectional elevational view of a flume tank apparatus used to measure hydrodynamic drag exhibited by netting;

FIG. 2b is an elevational view of four (4) netting panels taken along the line 2b-2b in FIG. 2, that are arranged in a pyramid shape for measurement of the hydrodynamic drag exhibited by the netting forming the panels;

FIG. 3 is a table which compares drag and breaking strength between conventional 100 mm machine-made netting and 100 mm netting made in accordance with the present invention;

FIG. 4 is a table which compares drag and breaking strength between conventional 200 mm machine-made netting and 200 mm netting made in accordance with the present invention for angle of attack, angle of mesh opening and cone angle which differ from those of FIG. 3; and FIG. 5, is a table which compares drag and breaking strength between conventional 400 mm machine-made netting and 400 mm netting made in accordance with the present invention using two different types of materials for the netting's twines.

BEST MODE FOR CARRYING OUT THE INVENTION

FIGS. 1a and 1b each respectively depict part of a machine-made netting panel in accordance with the present invention that is referred to by the general reference character 15. The back end of trawls are usually assembled using panels 15 of netting of the type depicted in FIG. 1a or 1b.

The material for netting panels 15 depicted in FIGS. 1a and 1b is knit in a pattern that is identical to a knitting pattern used for conventional machine-made netting in which the same twine of a pair of immediately adjacent twines always forms the loop while the other twine of a pair always forms the bight. Consequently, conventional machines which are capable of making either of the two (2) types of netting which possess the preceding characteristic may be used to knit netting in accordance with the present invention. However, netting in accordance with the present invention is preferably made using a conventional machine which between immediately adjacent knots alternates the direction in which the loop of the weavers knot turns.

A conventional net knitting machine, not illustrated in any of the FIGS., knots or "knits" the netting panel 15 from spools of twine or product strands that are mounted on the knitting machine. As explained in greater detail in Published Patent Cooperation Treaty ("PCT") international patent application WO 99/39572 ("the PCT patent application"), the knitting process for machine-made netting panel 15 may be understood as progressing row-by-row, from top to bottom in FIGS. 1a and 1b, each successive horizontal row being knit one after the other across the width of the netting panel 15. Knitting of the machine-made netting panel 15 proceeds at approximately a right angle to the ultimate, preferred direction of water flow past the netting panel 15, indicated by a water flow vector ("$V_0$") arrow 18, when the netting panel 15 is incorporated into a trawl that is towed through a water entrained environment. The PCT patent application is hereby incorporated by reference as though fully set forth here.

In accordance with the present invention, netting panels 15 are formed with alternating vertically oriented product strand rows identified herein respectively as shuttle twines 11 and as basic twines 13, In knitting machine-made netting panel 15, a number of individual spools, perhaps as many as 100, concurrently feed twines 11, 13 in parallel while the net making machine knits together pairs of the twines 11, 13 forming weavers knots 20 where the twines 11, 13 intersect. The knitting process alternates back-and-forth horizontally across the netting panel 15 to establish a zig-zag paths for the twines 11, 13. When viewed from the top of FIGS. 1a and 1b in the direction that the netting panel 15 feeds from the knitting machine, between every immediately adjacent pair of shuttle twines 11 there is a basic twine 13, and between every immediately adjacent pair of basic twines 13 there is a shuttle twine 11.

In the netting panel 15, the connected twines 11, 13 establish four-sided, diamond-shaped mesh cells 17, the sides of which are mesh bars 26. The twines 11, 13 each respectively form two (2) of the four (4) intersecting mesh bars 26 of each mesh cell 17. As depicted in FIGS. 1a and 1b, at each knot 20 in machine made netting the shuttle twine 11 does not cross over itself, while the basic twine 13 crosses over itself. More specifically, at each knot 20 pairs of mesh bars 26 formed by the shuttle twine 11 exit from the knot 20 on the same side of the basic twines 13. Conversely, the basic twine 13 forming pairs of mesh bars 26 exit the knot 20 on opposite sides of the shuttle twine 11.

In conventional machine made netting, the physical properties of the shuttle twines 11 and the basic twines 13 are substantially identical. That is, in conventional machine-made netting the same twine made from the same material is used both for the shuttle twines 11 and for the basic twines 13. The present invention departs from conventional netting manufacture by carefully selecting the basic twines 13 and the shuttle twines 11 to have varying physical properties which are particularly advantageous. Specifically, in accordance with the present invention, the physical properties of the shuttle twines 11 and the basic twines 13 are selected to dampen and attenuate vibrations and/or harmonic oscillations of the netting panel 15 while moving through the water entrained environment. The physical properties of the shuttle twines 11 and the basic twines 13 may differ in various ways such as making the shuttle twines 11 and basic twines 13 from materials having differing mechanical properties, or the mechanical properties, e.g. diameter, of the shuttle twine 11 and basic twine 13 may differ if they are made from the same material.

Compared with equivalent-strength conventional netting made with twines 11, 13 having substantially identical physical properties, netting made in accordance with the present invention exhibits significantly less drag due to the dampening and attenuation of netting vibrations and/or harmonic oscillations. The lesser vibration and/or harmonic oscillations exhibited by netting made in accordance with the present invention reduces the netting's drag because the energy which excites netting vibration and/or harmonic oscillation comes from energy expended in towing the netting through the water entrained environment. Drag reductions for nettings properly made in accordance with the present invention can be so great that during flume tank testing nettings made from common fibers, such as nylon or polyethylene, have exhibited less drag that comparable strength conventional nettings made from superfibers such as Spectra or Dyneema. Moreover, dampening and attenuation of vibrations, particularly resonant harmonic oscillations, lessens degradation during use of the material forming the twines 11, 13 thereby better preserving the netting's strength in comparison with conventional machine made netting.

Depending upon particular material(s) and structure(s) of the shuttle twines 11 and basic twines 13 used in making netting in accordance with the present invention, the twines 11, 13 have a preferred relationship to each other. Specifically, if the twines 11, 13 depicted in FIGS. 1a and 1b are made of the same nylon material, a conventional twisted twine shuttle twine 11 has a smaller diameter and/or material weight compared to a conventional twisted twine basic twine 13. More specifically, for such netting the diameter of the shuttle twine 11 may be between ninety-one one-hundredths (0.91) and six tenths (0.6) times the diameter of the basic twine 13. Preferably the diameter of the shuttle twine 11 is between seventy-five one-hundredths (0.75) and sixty-five one-hundredths (0.65) times the diameter of the basic twine 13.

When the same material is used for both twines twines 11, 13, regardless of the material used for the twines 11, 13, in general the smaller twine has a diameter that is between nine tenths (0.9) and five tenths (0.5) that of the larger diameter twine, and preferably has a diameter that is between seventy-five one-hundredths (0.75) and sixty-five one-hundredths (0.65) that of the larger diameter twine.

Furthermore, for twines 11, 13 made from any particular type of material, e.g. nylon or polyethylene, the diameter and/or material weight of the shuttle twine 11 may be less than the diameter and/or material weight of the basic twine 13 without lowering, and perhaps even increasing the netting's strength. Depending upon particular material and/or materials used for the twines 11, 13, it is possible by carefully selecting and testing the twines 11, 13 to substantially maintain or even to improve both the breaking strength of new netting and its resilience, i.e. the netting's resistance to fatigue failure.

Netting that exhibits this improved performance may be made in accordance with the present invention using a "compact twine," i.e. a twine having a core of loosely twisted or parallel lay filaments that are enclosed within a braided sheath. However, if the sheath of the compact twine encloses filaments made from a brittle material such as highly drawn polyethylene, particularly HTPE, then the basic twine 13 preferably has a diameter that is smaller than the diameter of the shuttle twine 11.

Regarding the relationship of the relative diameters of twines 11, 13 for specific materials, for nylon materials suitable for fish netting, e.g. type-6 (six) nylon, or type-66 (sixty-six) nylon, the larger diameter twine is basic twine 13 and the smaller diameter twine is the shuttle twine 11. The relationship between diameters and/or material weight of such twines 11, 13 is that described above. If a material quantitatively exhibits elasticity and recovery properties similar to the types of nylon described above, then the basic twine 13 should have a relationship to the shuttle twine 11 similar to that described above for the two types of nylon.

Alternatively, if a "compact twine" is used for both the twines 11, 13 and the compact twine's filaments are made from a currently available HTPE, or from a material that exhibits elasticity similar to or less than that of currently available HTPE, then the diameter of the basic twine 13 is smaller than that of the shuttle twine 11. The relationship between the weight, diameter and/or strength of the larger and smaller twines 11, 13 is as described above. Specifically, basic twines 13 having a diameter which is between approximately sixty-five one-hundredths (0.65) and seventy-five one-hundredths (0.75), particularly seventy one-hundredths (0.70), that of the larger diameter shuttle twine 11 have proven rather advantageous for compact twines, with the range of diameters and/or material weight as described above for HTPE.

A combination of a "compact twine" and a "non-compact twine" may be used advantageously in practicing the present invention. For twines 11, 13 having such differing constructions, the "compact twine" forming the basic twine 13 preferably uses a core material that is less elastic than nylon, particularly a core material such as HTPE. Usually, for this particular combination of twines 11, 13 having different constructions, the shuttle twine 11 is made using "non-compact twine."

An alternative embodiment of the present invention uses twines 11, 13 made from different materials, and the smaller of the twines 11, 13 is weaker, i.e. has a lower rupture point when tested as a single twine, than the larger diameter twines 11, 13. In this particular embodiment, the ratio of the strength of smaller twine to the larger twine is preferably in a range between 0.5:1.0 to 0.9:1.0, with a range of from 0.5:1.0 to 0.68:1.0 being preferred.

In another embodiment, if the material of a smaller twine 11 or 13 differs from the material of a larger twine 11 or 13, and one of the twines 11, 13 is more elastic than the other, then generally regardless of diameter the basic twine 13 is preferably less elastic than the shuttle twine 11.

In yet another embodiment, the material of shuttle twine 11 differs from the material of basic twine 13, one twine 11 or 13 being twisted and the other being braided (or including a braided cover or jacket, with, for example, a non-braided core). For example, shuttle twine 11 may be a braided or twisted nylon material, and basic twine 13 may be a braided HTPE material with a core overbraided by a jacket. In such an embodiment, the larger diameter twine forming the basic twine 13 is preferably made from HTPE material.

Varying properties for twines 11, 13 which may be exploited in practicing the present invention include:

1. different materials of filaments used in making the twines 11, 13;
2. different diameters for the twines 11, 13;
3. different basic constructions for the twines 11, 13, e.g. a twisted construction for the shuttle twine 11 and a braided (compact twine) construction for the basic twine 13;
4. different elasticity of filaments used in making the twines 11, 13;
5. different densities of filaments used in making the twines 11, 13;
6. different impregnation (bonding) of the twines used for the twines 11, 13 including spatially varying impregnation along a twine's length; and
7. a construction for at least one of several plaits or substrands used for assembling the twines 11, 13 that differs from the a construction of other plaits or substrands thereof.

Spatially varying impregnation along a twine's length may be obtained by mechanically incorporating solid pellets of an impregnation material among the plaits or substrands making up a twine during the twines assembly, and then heating the assembled twine so the impregnation material diffuses non-uniformly into the plaits or substrands forming the twine.

The construction of at least one of several plaits or substrands used for assembling the twines 11, 13 that differ may be obtained by:
1. impregnating, i.e. bonding, one of the plaits differently, preferably more heavily, from the twine's other plaits; or
2. using a different density material for one of the plaits than for the twine's other plaits.

Twines in which the construction of at least one of several plaits differ appear to be particularly advantageous for mesh cells 17 of a size almost one (1) meter or longer. This particular twine construction may also be applied advantageously for reducing vibration wherever fluid flows past a length of twine such as:
1. mooring lines for buoys, ships, oil drilling or refining platforms, antennas or fishing lines; or
2. paravane, seismic or other type of line that is towed through a water entrained environment.

What is essential in exploiting one or more of the ways for providing different physical properties listed above is that particular combinations for the twines 11, 13 be empirically evaluated to establish that a combination of varying physical properties dampen and/or attenuate vibrations and/or harmonic oscillations of the twines 11, 13.

INDUSTRIAL APPLICABILITY

Selecting Twines 11, 13

In fabricating netting in accordance with the present invention, first, one selects a particular conventional machine-made netting to be replaced by a netting made in accordance with the present invention. For example, netting having 100 mm mesh cells 17 and that is made entirely of third generation HTPE braided 3.5 mm twines. Such a netting, made by Euronete, S. A. of Maia, Portugal, is sold commercially under the brand name "Euroline Premium 3.5 mm."

Second, larger diameter and a smaller diameter twines must be selected. For the example set forth here the same twine as that used in the conventional machine-made netting to be replaced is chosen for the larger diameter twine. For the present example that choice is a 3.5 mm third generation HTPE braided twine. Then several smaller diameter third generation HTPE braided twines are chosen having diameters which are between six-tenths (0.6) and eight-tenths (0.8) times the diameter of the larger twine. In the present example, several HTPE braided twines having diameters between 2.1 mm and 2.8 mm are selected. Using an industry standard method, straight line breaking strength values are measured and recorded for twines of all selected diameters.

A factor which influences choosing diameters for the twines 11, 13 is that for netting having 100 mm mesh cells 17 the material forming the knots 20 constitutes a significant fraction of the total material used in the netting. Knotting of the basic twine 13 requires approximately three (3) times more material in the knots 20 than knotting the shuttle twine 11. Therefore, the total amount of material used in making a netting panel 15 will be less if a smaller diameter is chosen for the basic twine 13 than for the shuttle twine 11.

Third, after selecting and testing a set of twines, a number of individual mesh cells 17 are then assembled for testing using combinations of the larger diameter twine with each of the smaller diameter twines. For each twine diameter pair, two different types of mesh cells 17 are made for testing, i.e. one mesh cell 17 in which the basic twine 13 is the larger diameter twine and the shuttle twine 11 is the smaller diameter twine, and an opposite mesh cell 17 in which the shuttle twine 11 is the larger diameter twine and the basic twine 13 is the smaller diameter twine.

Fourth, using an industry standard method, samples of the conventional machine-made netting to be replaced and all the test mesh cells 17 assembled using different pairings of large and small diameter twines 11, 13 are tested for breaking strength. Preferably, the testing method used for all the mesh cells 17 is the standard "4 leg 1 knot" method, with an initial angle of mesh opening set at twenty degrees (20°). To obtain reliable data for breaking strength for the various mesh cells 17, the same testing protocol is repetitively applied to a number of samples both for mesh cells 17 made with each larger and smaller diameter twine pair, and for an equal number of samples of the conventional machine-made netting to be replaced.

If any of the mesh cells 17 made with different diameter twines 11, 13 exhibits a breaking strength equal to that of the conventional machine-made netting to be replaced, clearly that diameter pair for the twines 11, 13 is likely to be used in making the replacement netting in accordance with the present invention. However, because netting made in accordance with the present invention exhibits greater resilience and retains its strength better throughout the netting's service life, i.e. the netting resists fatigue failure better than conventional netting, replacement netting in accordance with the present invention is acceptable if the mesh cells 17 made with a particular pair of differing diameter twines 11, 13 exhibits a breaking strength which is only 75% that of the conventional machine-made netting to be replaced.

For the preceding example, mesh cells 17 made with a combination of Euroline Premium 3.5 mm for the shuttle twine 11 and Euroline Premium 2.5 mm for the basic twine 13 exhibit breaking strength equal to that of conventional machine-made netting in which Euroline Premium 3.5 mm forms both twines 11, 13. Euronete, S. A. reports a breaking strength value for Euroline Premium 2.5 mm netting that is approximately forty-five percent (45%) less than the breaking strength reported for comparable Euroline Premium 3.5 mm netting. Consequently, obtaining a breaking strength for mesh cells 17 in which all the basic twines 13, i.e. one-half of the twines 11, 13, are made from 2.5 mm diameter third generation HTPE braided twine which equals the breaking strength for mesh cells 17 in which all the twines 11, 13 are made from 3.5 m third generation HTPE braided twines is surprising, and contradicts beliefs of netting manufacturers. The preceding observation regarding breaking strength also indicates that it may be possible to further reduce the diameter of the basic twine 13 below 2.5 mm.

Trawl makers typically evaluate and purchase netting panels 15 based upon the breaking strength of a single unknotted twine of the type used for making the netting panel 15. This method for estimating the breaking strength of netting panels 15 is based upon an understanding that netting panels 15 will exhibit a breaking strength that is approximately forty-four percent (44%) to fifty-five (55%) of the twine's straight line breaking strength. Since machine-made knotted netting almost always breaks at the knots 20, it is believed that the forty-five (45%) to sixty-six. (66%) difference in breaking strength between the straight line breaking strength of un-knotted twine and that measured for twine in knotted netting results from knotting the twines 11, 13. Applying the preceding method to evaluate the mesh cells 17 of this example made in accordance with the present invention, the breaking strength of the weaker twine, i.e. the Euroline Premium 2.5 mm twine, would be thought to determine the breaking strength of the final mesh cells 17. However, the experimental results reported above demonstrate that such an evaluation would be erroneous. The experimental results reported above demonstrate that, despite the fact that fifty-percent (50%) of the netting's twines 11, 13 are made using the smaller diameter Euroline Premium 2.5 mm twine, for mesh cells 17 made with a smaller diameter but sufficiently strong basic twine 13, the breaking strength of the Euroline Premium 3.5 mm shuttle twine 11 determines the breaking strength of the mesh cells 17.

In the preceding example, netting in accordance with the present invention having the same strength as the conventional machine-made netting advantageously:
1. reduces the material required to make the netting by approximately thirteen and four tenths percent (13.4%); and
2. exhibits greater resilience thereby retaining its strength better throughout the netting's service life.

Moreover, because netting made with differing diameter twines 11, 13 exhibits greater resilience, if a trawl used a netting panel 15 made with 3.5 mm diameter twines 11, 13 to provide a specified service life, that netting panel 15 could be advantageously replaced with netting of the present invention made with differing diameter third generation HTPE braided twine twines 11, 13 both of which are smaller than 3.5 mm in diameter.

It is also noteworthy that mesh cells 17 made with a reversed combination of Euroline Premium 3.5 mm and 2.5 mm diameter twines, i.e. where the 3.5 mm diameter twine formed the basic twine 13 and the 2.5 mm diameter twine formed the shuttle twine 11, exhibited considerably less breaking strength than the advantageous combination described above. The preceding result indicates that particular combinations of twines 11, 13 having differing properties must be evaluated empirically to establish which one of the twines can be used advantageously for the shuttle twine 11, and which can be used advantageously for the basic twine 13.

Drag Testing Panels 15

After establishing that mesh cells 17 made with a combination of Euroline Premium 3.5 mm for the shuttle twine 11 and Euroline Premium 2.5 mm for the basic twine 13 exhibit breaking strength equal to that of conventional machine-made netting in which Euroline Premium 3.5 mm forms both twines 11, 13, netting panels 15 were assembled to investigate the hydrodynamic drag characteristics of such netting. Various methods are known and used for measuring drag exhibited by netting panels 15 of differing construction. Some of these drag testing methods are performed in a flume tank. Other drag testing methods require assembling a small trawl, or section of a trawl, towing it behind a vessel, and recording tow speed for netting panels 15 of differing construction. The methods for measuring drag by towing netting panels 15 of differing construction behind a vessel do not facilitate visually observing vibrations, such as harmonic oscillation, occurring in the netting panels 15.

FIG. 2 depicts a 2.0 m deep flume tank apparatus that is used to measure hydrodynamic drag exhibited by netting panels 15, and that is referred to by the general reference character 30. To measure hydrodynamic drag ($R_x$), as depicted in FIGS. 2 and 2b, netting panels 15 are fastened along 1.0 m long edges of a square-shaped frame 32 and arranged to form faces of a four (4) panel pyramid 34. The frame 32 encompasses a base of the pyramid 34. Ends of X-shaped cables 36 connect respectively to four (4) corners of the frame 32. A cross-bar 38 is interposed between the intersection of the cables 36 and a vertex 42 of the pyramid 34 which extends a distance $D_1$ of approximately 1.6 m from the frame 32. Interposed in this way, the cross-bar 38 applies approximately fifty (50) kg of tension to the vertex 42 of the pyramid 34 to simulate force applied to the netting panels 15 if they were incorporated into a trawl being towed through a water entrained environment. Arranged in this way, the netting panels 15 have substantially the same angles of mesh opening and cone angle, plus or minus two degrees (±2°). Due to differences in elongation properties and minute discrepancies in the sizes of individual meshes of the netting, angles of mesh openings and cone angle provided by the apparatus depicted in FIG. 2 are substantially those that occur during use of netting in a trawl.

To measure hydrodynamic drag, the netting panels 15 arranged in the pyramid 34 are immersed in water flowing through the flume tank 30. To obtain accurate hydrodynamic drag measurements, the pyramid 34 is made as large as possible to occupy the entire cross-sectional area of the flume tank 30 in which there exists parallel laminar water flow without approaching too close to walls of the flume tank 30 where turbulent flow occurs.

Ends of four bridles 52 extending forward from the base of the pyramid 34 respectively interconnect between four (4) corners of the frame 32 and a cable 54. The cable 54 extending forward of the pyramid 34 passes around a pulley 56 that is fixed with respect to the flume tank 30 at a distance $D_2$ of approximately 3.0 m from the base of the pyramid 34. From the pulley 56, the cable 54 then slopes upward over a horizontal distance $D_3$ of approximately 6.0 m to a scale 58 that is also fixed with respect to the flume tank 30 above the surface of water flowing therein. Accurate digital weight scales such as used to weigh suspended items may be used for the scale 58. Arranged in this way, the scale 58:
1. restrains the pyramid 34 from moving with respect to the flume tank 30 as water flows from left to right in FIG. 2 as indicated the arrow 18 which represents the water flow vector $V_0$; and
2. measures hydrodynamic drag produced by the pyramid 34.

Before attempting to measure the hydrodynamic drag of netting panels 15, the hydrodynamic drag of the frame 32 is measured without any netting panels 15 attached thereto. Measurements are taken for water velocities $V_0$, in increments that do not exceed one quarter meter per second (0.25 m/s) and are preferably smaller, over a range of velocities which it is anticipated the netting may be used.

After carefully measuring the drag of the frame 32, the netting panels 15 are attached to the frame 32 and hydrodynamic drag of the pyramid 34 mounted thereon is measured over a range of velocities which it is anticipated the netting may operate. The hydrodynamic drag measurements obtained for the frame 32 without the netting panels 15 are subtracted from those measured for the pyramid 34 formed by the netting panels 15 to obtain the hydrodynamic drag due to the netting panels 15.

As set forth in the table of FIG. 3, 100 mm mesh cells 17 of both constructions exhibit the same breaking strength plus or minus five kilograms (±5.0 kg). For testing in the flume tank 30, the netting panels 15 have a measured angle of mesh opening ($a_b$), illustrated in FIG. 2, of thirty degrees plus or minus one degree (30°±1°), and a measured cone angle ($a_c$), also illustrated in FIG. 2, of thirteen and one-half degrees plus or minus one degree (13.5° ±1°). An angle of attack ($a_{at}$) for the netting panels 15, calculated as $$a_{at}=\cos^{-1}[\cos(a_c) \times \cos(a_b)],$$

is thirty-three degrees plus or minus one degree (33°±1°). For the test results reported in FIG. 3 the angle of attack ($a_{at}$) is larger than is realistic for design parameters used for the back end of pelagic (midwater) trawls. Nevertheless, the netting panel 15 made in accordance with the present invention exhibits substantially less drag than the comparable, conventional machine-made netting.

The 100 mm netting panels 15 made in accordance with the present invention have a projected area that is approximately eighty-five and seven-tenths percent (85.7%) of the projected area for the conventional machine-made netting panels 15 to be replaced. Because the projected are of the 100 mm netting panels 15 made in accordance with the present invention is fourteen and three-tenths percent (14.3%) smaller than the projected area of the conventional machine-made netting panels 15, it can be inferred that the 100 mm netting panels 15 made as described above should exhibit fourteen and three-tenths percent (14.3%) less drag when tested in the flume tank 30 merely because of the smaller projected area.

During testing in the flume tank 30 under the conditions summarized above, as recorded in FIG. 3 the 100 mm netting panels 15 made as described above with twines 11, 13 that have different physical properties exhibited markedly less hydrodynamic drag than the conventional machine-made netting to be replaced. For velocities of the water flow vector $V_0$, indicated by the arrow 18, of 1.5 m/s and 1.75 m/s the hydrodynamic drag of the conventional machine-made netting panels 15 was respectively fifteen percent (15%) and seventeen percent (17%) greater than the hydrodynamic drag of netting panels 15 made in accordance with the present invention. Only at a velocity for the water flow vector $V_0$ of 2.0 m/s did the 100 mm netting panels 15 made as described above exhibit a hydrodynamic drag reduction which would be anticipatable based upon a fourteen and three-tenths percent (14.3%) smaller projected area.

The table of FIG. 4 presents test results for netting panels 15 assembled similar to the 100 mm example set forth above except for 200 mm mesh cells 17. Drag measurements made in the flume tank 30 and presented in FIG. 4 were performed under conditions that differed slightly from those for the 100 mm netting panels 15 set forth in FIG. 3. For the drag measurements set forth in FIG. 4, the measured angle of mesh opening ($a_b$) was twenty-seven degrees plus or minus one degree (27°±1°), the measured cone angle ($a_c$) was fourteen degrees plus or minus one degree (14°±1°), and the calculated angle of attack ($a_{at}$) was thirty degrees plus or minus one degree (30°±1°). For the test results summarized in FIG. 4, the angles of mesh opening ($a_b$) and of attack ($a_{at}$) and the cone angle ($a_c$) represent one extreme of realistic design parameters used for the back end of pelagic (midwater) trawls.

The 200 mm netting panels 15 made in accordance with the present invention use approximately eighty-six and six tenths percent (86.6%) of the material required for the conventional machine-made netting panels 15 to be replaced, and have a projected area that is approximately eighty-five and one-half percent (85.5%) of the projected area of the conventional netting panel 15. Because the projected area of the 100 mm netting panels 15 made in accordance with the present invention is fourteen and one-half percent (14.5%) smaller than the projected area of the conventional machine-made netting panels 15, it can be inferred that the 100 mm netting panels 15 made as described above should exhibit fourteen and one-half percent (14.5%) less drag when tested in the flume tank 30 merely because of the smaller projected area.

During testing in the flume tank 30, the 200 mm netting panels 15 made as described above with twines 11, 13 having different physical properties exhibited significantly less hydrodynamic drag than the conventional machine-made netting to be replaced for all velocities of the water flow vector $V_0$. For 1.5 and 1.75 m/s velocities of the water flow vector $V_0$ the conventional machine-made netting panels 15 exhibited a twenty percent (20%) higher drag than the netting panels 15 made in accordance with the present invention, and for a 2.0 m/s velocity a thirty-one (31%) higher drag, More Examples of the Present Invention HTPE and Nylon In this example a urethane coated conventional twisted three strand nylon twine having a diameter of approximately 2.8 mm that is labeled as "40 denier" by the twine's manufacturer forms the shuttle twine 11. A HTPE twine having a non-braided core with a braided jacket, and having a diameter of 4.0 mm made by Euronete and labeled "Euroline 4 mm" forms the basic twine 13. The table of FIG. 5 summarize the hydrodynamic drag and breaking strength characteristics of netting panels 15 having 400 mm mesh cells 17 made with this combination of materials in comparison with conventional machine-made netting panels 15 made entirely from the Euroline 4 mm twine. As shown in FIG. 5, the breaking strength of mesh cells 17 in which nylon and HTPE respectively form the twines 11, 13 equals if not exceeding that of mesh cells 17 made entirely from the Euroline 4 mm twine. The netting panels 15 made with the combination of nylon and HTPE twines 11, 13 use approximately twenty-two and one-half percent (22.5%) less material, and have a projected area that is approximately eighty-three and six-tenths percent (83.6%) of the projected area for the conventional machine-made netting panels 15. It can therefore be inferred that when tested in the flume tank 30 the 400 mm mesh size netting panels 15 assembled as described above should exhibit sixteen and four-tenths percent (16.4%) less drag compared with the conventional machine-made netting panels 15 merely because of the smaller projected area.

For drag measurements on 400 mm netting panels 15 set forth in FIG. 5 the measured angle of mesh opening ($a_b$) was twenty-seven degrees plus or minus two degrees (27°±2°), the measured cone angle ($a_c$) was twenty-three degrees plus or minus one degree (23°±1), and the calculated angle of attack ($a_{at}$) was thirty-six degrees plus or minus one degree (36°±1°). During testing in the flume tank 30, the 400 mm netting panels 15 made as described above exhibited significantly less hydrodynamic drag than the conventional machine-made netting to be replaced for all velocities of the water flow vector $V_0$. For a 1.5 m/s velocity the conventional machine-made netting panels 15 exhibited a sixty-one percent (61%) higher drag than the netting panels 15 made in accordance with the present invention, for a 1.75 m/s velocity the conventional machine-made netting panels 15 exhibited a sixty-six (66%) higher drag, and for a 2.0 m/s velocity a fifty-percent (50%) higher drag. Furthermore, tests conducted after several weeks of use showed a significantly greater breaking strength for the 400 mm mesh cells 17 made as described above compared with the conventional machine-made netting panels 15. Such results are extremely favorable in that, as stated above, they satisfy a need long felt in the industry for netting made from less expensive materials that exhibits less drag than a comparable netting panel 15 made from a superfiber such as Dyneema.

Superfibers

In manufacturing netting panels 15 in accordance with the present invention from essentially inelastic superfibers, i.e. less than 4% elastic elongation, for example from Dyneema, constructions and arrangements of the twines 11, 13 described above are useful. Often, depending upon the mechanical elongation potential of the specific twine construction as contrasted to the filament used in making a twine, arrangements similar to that described for compact twines are preferred. Also, care should be taken in designing the netting to determine which of the twines 11, 13 shall be reduced in weight and/or diameter while simultaneously retaining the breaking strength desired for mesh cells 17. Considering the high cost of Dyneema, reducing the amount of material required for a netting panel 15 responds to a long felt need in the industry. For a particular diameter of the twines 11, 13, netting panels 15 made with superfibers, particularly non-elastic Dyneema material, usually exhibit remarkably large vibration and/or harmonic oscillation, and a correspondingly unanticipatedly higher drag. Netting made in accordance with the present invention from such materials should have a markedly lower material cost, and exhibit significantly less drag.

If a desire exists for netting panels 15 which exhibit very low drag in combination with elasticity, a superfiber twine 11 or 13, such as Dyneema, may, in accordance with the present invention, be combined with an elastic twine 11 or 13, for example a nylon twine. Properly combining a non-elastic material such as polyester twines 11, 13 with nylon twines 11, 13, including high tenacity nylon, will also reduce material cost, and exhibit significantly reduced drag.

Vibration, Oscillation, Drag and Resilience

During testing in the flume tank 30, the 100 mm, 200 mm and 400 mm netting panels 15 for which data appears respectively in FIGS. 3-5 exhibited no vibration such as harmonic oscillation (resonance) for all tested velocity values of the water flow vector $V_0$ indicated by the arrow 18. Conversely, all the conventional machine-made netting panels 15 to be replaced exhibited vibration such as harmonic oscillation (resonance) during testing in the flume tank 30.

Vibrations, such as harmonic oscillations, can occur within a netting panel 15 in at least two distinctly different ways. First, individual mesh bars 26, or a series of collinear and connected mesh bars 26, can vibrate or harmonically oscillate similar to a plucked taut string. For example in this particular mode of vibration or harmonic oscillation, knots 20 at opposite ends of one mesh bar 26, or of a series of more mesh bars 26, could remain relatively fixed while the twine 11 or 13 between the two knots 20 vibrates or oscillates. In netting panels 15 made in accordance with the present invention, along series of collinear and connected mesh bars 26 the twines 11, 13 alternate. That is, except at the edges of the netting panel 15, shuttle twines 11 forming individual mesh bars 26 connect to opposite ends of a mesh bar 26 formed by the basic twine 13, and basic twines 13 forming individual mesh bars 26 connect to opposite ends of a mesh bar 26 formed by the shuttle twine 11. If physical properties of the twines 11, 13 are selected to differ appropriately in accordance with the present invention, then shuttle twines 11 connected to each end of the basic twines 13 can dampen or attenuate any tendency for the basic twine 13 in the netting panel 15 to vibrate or harmonically oscillate. Correspondingly, basic twines 13 connected to each end of the shuttle twines 11 in the netting panel 15 can dampen or attenuate any tendency for the shuttle twine 11 in the netting panel 15 to vibrate or harmonically oscillate. Because energy needed to excite vibrations or harmonic oscillations of individual mesh bars 26 or a series of collinear and connected mesh bars 26 first enters netting panels 15 through individual mesh bars 26, dampening or attenuating any tendency for mesh bars 26 to vibrate or harmonically oscillate removes such energy from netting panels 15.

A second way in which the netting panel 15 may vibrate or harmonically oscillate is for vibratory or oscillatory waves to propagate across the netting panel 15 analogous to a flag flapping in the wind. Removing energy from a netting panel 15 that excites vibrations or harmonic oscillations of individual mesh bars 26 or a series of collinear and connected mesh bars 26 inherently removes from the netting panel 15 energy needed to excite vibratory or oscillatory waves that propagate across the netting panel 15.

Because the netting panel 15 must absorb energy that excites either or both of the two (2) preceding modes of vibrations or harmonic oscillations within the netting panel 15, when netting panels 15 are incorporated into a trawl the only source of driving energy is the vessel which tows the trawl. Thus, if one considers two (2) trawls respectively assembled with different netting panels 15 the twines 11, 13 of which have the same projected area, one trawl in which netting panels 15 exhibit substantially reduced or no vibrations or harmonic oscillations while being towed, and the other trawl in which netting panels 15 exhibit greater vibrations or harmonic oscillations, a trawl made with the second netting panels 15 will exhibit a more drag than a trawl made with the first netting panels 15 because of the energy which the second netting panel 15 must absorb to excite the larger vibrations or harmonic oscillations of the netting panels 15.

Testing in the flume tank 30 can be performed only for relatively small netting panels 15. That is, the flume tank 30 can accommodate only a limited amount of netting compared to the amount actually used in the netting panel 15 of a trawl. In comparison with netting panels 15 in a trawl, the small size of the netting panel 15 that can be tested in the flume tank 30 permits only shorter vibratory or oscillatory waves to propagate through the experimental netting panels 15. Increasing the size of the netting panels 15 permits propagation of longer vibratory and/or oscillatory waves. If the structure of the netting panels 15 doesn't inherently attenuate (dampen) vibrations or oscillations, peaks and valleys of vibrations or oscillations propagating through netting panels 15 amplify any vibration or oscillation thereby exponentially increasing turbulence, and the hydrodynamic drag of the trawl resulting from the turbulence. Consequently, testing in the flume tank 30 does not fully demonstrate the hydrodynamic drag characteristics of a netting panel 15, and the drag in real trawl applications is usually larger than that measured in the flume tank 30. Thus, a difference in hydrodynamic drag exhibited by trawls assembled respectively using netting panels 15 which inherently attenuate vibrations and/or harmonic oscillations and using netting panels 15 that don't attenuate vibrations and/or harmonic oscillations tends to increase as the size of the netting panels 15 increase. Therefore, the difference in drag between netting panels 15 constructed in accordance with the present invention and conventional machine-made netting panels 15 increases when the improved netting panels 15 are used in real fishing gear applications.

In addition to reduced hydrodynamic drag, eliminating vibrations and/or harmonic oscillations in netting made in accordance with the present invention also increases the netting's resilience. The energy present in the vibrations and/or harmonic oscillations exhibited by conventional machine-made netting has to be dissipated somewhere in the netting panel 15. Because the netting panel 15 is under tension when incorporated into a trawl and towed through the water entrained environment the knots 20 joining mesh bars 26 to each other dissipate most or all of the energy present in the vibrations and/or harmonic oscillations. Dissipation of energy in the knots 20 causes the material of the twines 11, 13 to degrade more rapidly than elsewhere in the netting panel 15. Dissipation of vibratory or oscillatory energy in the knots 20 and degradation of the material forming the knots 20 explains why conventional machine-made knotted netting almost always breaks at the knots 20. This understanding of the failure mode for conventional machine-made knotted netting also explains why the improved netting of the present invention, because it vibrates and/or oscillates less than conventional netting, exhibits greater resilience, i.e. increased resistance to fatigue failure.

If during testing in the flume tank 30 at any velocity for the water flow vector $V_0$ experimental netting panels 15 made in accordance with the present invention exhibit vibrations, such as harmonic oscillations, that are similar to or exceed those exhibited by a comparable, conventional machine-made netting panel 15, then the experimental sample being tested is unacceptable. When such vibrations and/or harmonic oscillations appear during testing in the flume tank 30, it becomes necessary to test other combinations of twines 11, 13 having varying physical properties until finding a combination of twines 11, 13 that exhibits less vibration or harmonic oscillation for all anticipated velocities of the water flow vector $V_0$.

Designing to Reduce Vibrations

To reduce as much as practicable drag properties of netting made in accordance with the present invention, for a particular mesh size it is important to empirically determine that the individual mesh bar 26, i.e. the portion of a twine 11 or 13 between knots 20, does not exhibit vibration and/or harmonic oscillation at intended water velocities of the water flow vector $V_0$, indicated by the arrow 18. To accomplish this, various mesh sizes made of various experimental embodiments of netting panels 15 must be tested in the flume tank 30 at various water velocities, e.g. at 1.5, 1.75 and 2.0 m/s. It appears that in general vibrations and/or harmonic oscillation occur in only one mesh bar 26, often the mesh bar 26 formed by the shuttle twine 11. If such vibration and/or harmonic oscillation occurs in a mesh bar 26, the drag of the netting panels 15 generally increased approximately eleven percent (11%), or even to such an extent that the drag of the experimental netting panels 15 exceeds the drag of the comparable conventional machine-made netting panels 15. One or more of the following techniques, either alone or in combination, may be used in an attempt to obtain a lower drag netting panel 15.

1. The ratio of the diameters and/or material weight is altered for twines 11, 13 making up the mesh bars 26 which exhibit vibration and/or harmonic oscillation may be changed so they become dampened or attenuated.
2. The proportionate amount of bonding and/or impregnation in the twines 11, 13 may be altered, including omitting bonding and/or impregnation, so vibration and/or harmonic oscillation are dampened or attenuated.
3. The materials of filaments used in making the twines 11, 13, including concentration (also known as "draw") may be varied and/or altered for the twines 11, 13 so vibration and/or harmonic oscillation are dampened or attenuated.
4. Twines having differing constructions may be used for the twines 11, 13.
5. If suitable for the intended use of the netting, the ratio of the length of the mesh bars 26 and/or the exact mesh size may be altered, often minutely, so vibration and/or harmonic oscillation are dampened or attenuated.

In designing a netting panel 15 that reduces vibrations and/or harmonic oscillations it is important to configure the netting of the present invention so that the nodes of a wave travelling along a mesh bar 26, i.e. that point on the mesh bar 26 where a wave of a vibration or harmonic oscillation has a zero amplitude, avoids:

1. where the mesh bar 26 meets the knot 20; and
2. any portion of the knot 20.

Using the Netting

The common practice in the trawl industry for conventional machine-made netting is to orient netting panels 15 so the water flow vector $V_0$, indicated by the arrow 18, will generally be in a direction perpendicular to the direction of the nettings manufacture. Various orientations for the netting are useful, but the main direction of tension (largest magnitude of load vectors) along the netting panel 15 is best taken in a direction generally along the arrow arrow 18, i.e. perpendicular to the direction of manufacture of the netting panel 15. This orientation with respect to the water flow vector $V_0$ for the netting panels 15 causes water to flow past successive columns of the twines 11, 13 rather than along rows of the twines 11, 13. Netting made in accordance with the present invention should be used with the same orientation for netting panels 15 as the orientation used for conventional netting because that orientation reduces sliding of the weavers knots 20. Thus, for use in trawls, it is advantageous if netting made in accordance with the present invention be oriented in the trawl the direction indicated by the arrow 18 in FIGS. 1a and 1b.

While thus far netting manufactured in accordance with the present invention has been described as being useful for the back ends of trawls, the characteristics exhibited by such netting adapt it for advantageous use in other applications. In seines nets, bulky conventional netting slows descent of the seine net which produces billows in the netting that may unintentionally trap of marine organisms including mammals. Thus, seine nets can advantageously use netting which is lighter and which allow the seine to descend more rapidly. Netting made in accordance with the present invention permits seine nets to descend more rapidly thereby reducing billows and bycatch in the seine net. Thus, the netting of the present invention can be used advantageously in all different types of seine nets such as purse seines, and tuna seines, and even Danish seines. For use in Seines, particularly the falling sections of purse seines, the netting should be oriented the same with respect to the water flow vector $V_0$ as for trawls.

Moreover, netting in accordance with the present invention is useful not only in fishing nets, but is also useful in constructing barrier nets that prevent migrating or protected fish from migrating toward and near pump intakes such as occur at various different types of power plants. Similarly, barrier nets for fish pens, particularly in high current areas, may advantageously exploit the improved netting's lesser amount of material, lower manufacturing cost, reduced drag which lower forces on mooring or towing systems, and longer life. Another advantageous use for netting in accordance with the present invention is barrier nets such as those used at ballparks, particularly when replacing nets made of costly materials such as Dyneema. Barrier netting may also be made with knotless netting technology, especially when the twines are made from different materials including chemical composition, and/or concentration. Also to increase service life of barrier netting in accordance with the present invention, conventional machine-made netting may, after manufacture, be coated with a bonding material in striped or patterned areas to attenuate vibration.

Although the present invention has been described in terms of the presently preferred embodiment, it is to be understood that such disclosure is purely illustrative and is not to be interpreted as limiting. For example, different terms of art may be used in place of those terms "Shuttle" or "Basic" used above, whether for twines, or in reference to a knotting machine or manufacturing process for knotted netting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method of making improved netting that includes mesh cells having pairs of mesh bars fabricated from at least one continuous length of twine, pairs of mesh bars of each mesh cell being connected at intersections therebetween, the method comprising the step of:

forming sections of the improved netting with at least two continuous lengths of twine, respectively a basic twine and a shuttle twine, that connect to each others at intersections therebetween, the twines respectively having differing physical properties whereby vibration of the improved netting is capable of being attenuated by the differing physical properties when a panel of the improved netting is subject to fluid movement, said differing physical properties including differing physical characteristics respectively for the basic twine and shuttle twine.

2. The method of making improved netting of claim 1 further comprising the step of selecting for at least one of the twines a twine having at least one plait, of several plaits making up the twine, to have a construction which differs from constructions of other plaits of the twine thereby providing at least one differing physical characteristic for the twines.

3. The method of making improved netting of claim 1 further comprising the step of selecting for the basic twine and for the shuttle twine twines which have different diameters thereby providing differing physical characteristics for the twines thereby providing differing physical characteristics for the twines.

4. The method of making improved netting of claim 1 further comprising the step of selecting for the basic twine and for the shuttle twine twines which have different diameters, wherein the basic twine has a diameter larger than that of the shuttle twine.

5. The method of making improved netting of claim 1 further comprising the step of selecting for the basic twine and for the shuttle twine twines which are formed mainly from fibers having different elasticity thereby providing differing physical characteristics for the twines.

6. The method of making improved netting of claim 1 further comprising the step of selecting for the basic twine and for the shuttle twine twines which are made mainly from fibers formed of substances having different densities thereby providing differing physical characteristics for the twines.

7. The method of making improved netting of claim 1 further comprising the step of selecting for the basic twine and for the shuttle twine twines which have different bonding thereby providing differing physical characteristics for the twines.

8. An improved netting that includes mesh cells having pairs of mesh bars fabricated from at least one continuous length of twine, pairs of mesh bars of each mesh cell being connected at intersections therebetween, the improved netting comprising:

sections of the improved netting formed from at least two continuous lengths of twine, respectively a basic twine and a shuttle twine, that connect to each others at intersections therebetween, the twines respectively having differing physical properties whereby vibration of the improved netting is capable of being attenuated by the differing physical properties when a panel of the improved netting is subject to fluid movement, said differing physical properties including differing physical characteristics respectively for the basic twine and shuttle twine.

9. The improved netting of claim 8 wherein at least one of the twines is a twine having at least one plait, of several plaits making up the twine, which has a construction which differs from constructions of other plaits of the twine thereby providing at least one differing physical characteristic for the twines.

10. The improved netting of claim 8 wherein the basic twine and shuttle twine have different diameters thereby providing differing physical characteristics for the twines.

11. The improved netting of claim 8 wherein the basic twine has a diameter larger than that of the shuttle twine thereby providing differing physical characteristics for the twines.

12. The improved netting of claim 8 wherein the basic twine and shuttle twine are formed mainly from fibers having different elasticity thereby providing differing physical characteristics for the basic twine and for the shuttle twine twines.

13. The improved netting of claim 8 wherein the basic twine and shuttle twine are made mainly from fibers formed of substances thereby providing differing physical characteristics for the twines.

14. The improved netting of claim 8 wherein the basic twine and shuttle twine have different bonding thereby providing differing physical characteristics for the twines.

* * * * *